United States Patent
Kim et al.

(10) Patent No.: US 9,658,482 B2
(45) Date of Patent: May 23, 2017

(54) LIQUID CRYSTAL DISPLAY

(71) Applicant: Samsung Display Co., Ltd., Yongin, Gyeonggi-Do (KR)

(72) Inventors: Young Gu Kim, Hwaseong-si (KR); Baek Kyun Jeon, Yongin-si (KR); Min-Sik Jung, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/327,787

(22) Filed: Jul. 10, 2014

(65) Prior Publication Data

US 2015/0205160 A1    Jul. 23, 2015

(30) Foreign Application Priority Data

Jan. 20, 2014    (KR) .......................... 10-2014-0006916

(51) Int. Cl.
*G02F 1/1335* (2006.01)
*G02F 1/1339* (2006.01)

(52) U.S. Cl.
CPC .... *G02F 1/133512* (2013.01); *G02F 1/13394* (2013.01); *G02F 1/133514* (2013.01); *G02F 2201/40* (2013.01)

(58) Field of Classification Search
CPC ...................... G02F 1/1339; G02F 1/133512
See application file for complete search history.

(56) References Cited

U.S. PATENT DOCUMENTS

| | | | |
|---|---|---|---|
| 8,547,517 B2* | 10/2013 | Min et al. ..................... | 349/156 |
| 2007/0115412 A1* | 5/2007 | Tsuchiya et al. ............. | 349/117 |
| 2010/0033657 A1* | 2/2010 | Choi et al. .................... | 349/104 |
| 2010/0073609 A1* | 3/2010 | Matsumori et al. ........... | 349/96 |
| 2010/0157220 A1 | 6/2010 | Shin et al. | |
| 2013/0162926 A1 | 6/2013 | Kwack et al. | |

FOREIGN PATENT DOCUMENTS

| | | |
|---|---|---|
| JP | 3441047 B2 | 6/2003 |
| JP | 2005-258176 A | 9/2005 |
| JP | 2013-009123 A | 1/2013 |
| KR | 1020000055745 A | 9/2000 |
| KR | 10-0936958 B1 | 1/2010 |
| KR | 1020100129023 A | 12/2010 |

* cited by examiner

*Primary Examiner* — James Dudek
(74) *Attorney, Agent, or Firm* — Cantor Colburn LLP

(57) ABSTRACT

A liquid crystal display includes a plurality of red pixel areas, a plurality of green pixel areas, a plurality of blue pixel areas, and a light blocking member which defines the plurality of red pixel areas, the plurality of green pixel areas, and the plurality of blue pixel areas therein, and includes an expansion portion which overlaps a spacer which maintains a cell gap and is provided between the plurality of green pixel areas and the plurality of blue pixel areas and between the plurality of red pixel areas and the plurality of green pixel areas.

18 Claims, 8 Drawing Sheets

LIQUID CRYSTAL DISPLAY

This application claims priority to Korean Patent Application No. 10-2014-0006916, filed on Jan. 20, 2014, and all the benefits accruing therefrom under 35 U.S.C. §119, the entire contents of which are incorporated herein by reference.

BACKGROUND (a) Field

Embodiments of the invention relate to a liquid crystal display.

(b) Description of the Related Art

A liquid crystal display ("LCD") is one of flat panel displays which are currently most widely used, and includes two sheets of display panels in which field generating electrodes are formed, and a liquid crystal layer interposed therebetween. A voltage is applied to the electrodes to change directions of liquid crystal molecules to thereby control transmittance of light transmitted through the liquid crystal layer.

An upper panel and a lower panel among the two sheets of display panels of the LCD are supported by a spacer such that a cell gap is maintained.

The LCD includes an alignment layer for alignment in an initial alignment direction of the liquid crystal molecules. The alignment layer may be rubbed in a constant direction through a rubbing process. In this case, the spacer may cause an alignment failure. The alignment failure due to the spacer may cause light leakage at the peripheral area of the spacer. In order to prevent light leakage due to the spacer, a light blocking member is expanded so as to be overlapped with the spacer.

SUMMARY

When a light blocking member is expanded, a pixel aperture ratio is deteriorated, and an aperture ratio difference between a pixel where a spacer is provided and a pixel where the spacer is not provided may cause deterioration of a display quality.

Exemplary embodiments of the invention has been made in an effort to provide a liquid crystal display ("LCD") that can effectively reduce an aperture ratio difference between a pixel where the spacer is provided and a pixel where the spacer is not provided, and that can also effectively prevent deterioration of the entire aperture ratio due to a light blocking member.

An LCD according to an exemplary embodiment of the invention includes a plurality of red pixel areas, a plurality of green pixel areas, a plurality of blue pixel areas, a spacer configured to maintain a cell gap and light blocking members which defines the plurality of red pixel areas, the plurality of green pixel areas, and the plurality of blue pixel areas therein, and includes an expansion portion that overlaps the spacer, and is provided between the plurality of green pixel areas and the plurality of blue pixel areas and between the plurality of red pixel areas and the plurality of green pixel areas.

In an exemplary embodiment, a width of the expansion portion may be smaller than or equal to a width of the light blocking member in a same direction.

In an exemplary embodiment, the expansion portion may be provided between the plurality of blue pixel areas and the plurality of red pixel areas.

In an exemplary embodiment, the plurality of red pixel areas, the plurality of green pixel areas, and the plurality of blue pixel areas may be arranged in a matrix.

In an exemplary embodiment, the width of the light blocking member may be a distance between adjacent rows in the matrix.

In an exemplary embodiment, a diameter of the spacer may be smaller than the width of the expansion portion.

In an exemplary embodiment, the LCD may further include a lower panel including a first alignment layer and an upper panel facing the lower panel and including a second alignment layer, and the first alignment layer and the second alignment layer may be photo-aligned layers.

In an exemplary embodiment, the first alignment layer and the second alignment layer may be horizontal alignment layers.

In an exemplary embodiment, the first alignment layer and the second alignment layer may include at least one of a cyclobutane-based photodegradable material and an azobenzene-based photoisomerization material.

In an exemplary embodiment, the spacer may maintain the cell gap by supporting the lower panel and the upper panel.

An LCD according to another exemplary embodiment of the invention includes a lower panel including a first substrate, a thin film transistor provided on the first substrate, a passivation layer provided on the thin film transistor, a pixel electrode provided on the passivation layer, and a first alignment layer on the pixel electrode, an upper panel which includes a second substrate, a light blocking member and a color filter that are provided on the second substrate, and faces the lower panel, and a spacer configured to maintain a cell gap by supporting the lower panel and the upper panel, where the light blocking member defines a plurality of red pixel areas, a plurality of green pixel areas, and a plurality of blue pixel areas, and includes an expansion portion overlapping the spacer, and a width of the expansion portion is smaller than or equal to a width of the light blocking member in a same direction.

In an exemplary embodiment, the expansion portion may be provided between the plurality of green pixel areas and the plurality of blue pixel areas and between the plurality of red pixel areas and the plurality of green pixel areas.

In an exemplary embodiment, the expansion portion may be provided between the plurality of blue pixel areas and the plurality of red pixel areas.

In an exemplary embodiment, the plurality of red pixel areas, the plurality of green pixel areas, and the plurality of blue pixel areas may be arranged in a matrix.

In an exemplary embodiment, the width of the light blocking member may be a distance between adjacent rows in the matrix.

In an exemplary embodiment, a diameter of the spacer may be smaller than the width of the expansion portion.

In an exemplary embodiment, the LCD may further include a second alignment layer on the light blocking member and the color filter.

In an exemplary embodiment, the first alignment layer and the second alignment layer may be photo-aligned layers.

In an exemplary embodiment, the first alignment layer and the second alignment layer may be horizontal alignment layers.

In an exemplary embodiment, the first alignment layer and the second alignment layer may include at least one of a cyclobutane-based photodegradable material and an azobenzene-based photoisomerization material.

According to the invention, deterioration of an aperture ratio can be effectively prevented by a light blocking member provided for effectively preventing light leakage of the spacer.

In addition, an aperture ratio difference between a pixel where the spacer is provided and a pixel where the spacer is not provided can be effectively reduced, thereby effectively preventing deterioration of display quality.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
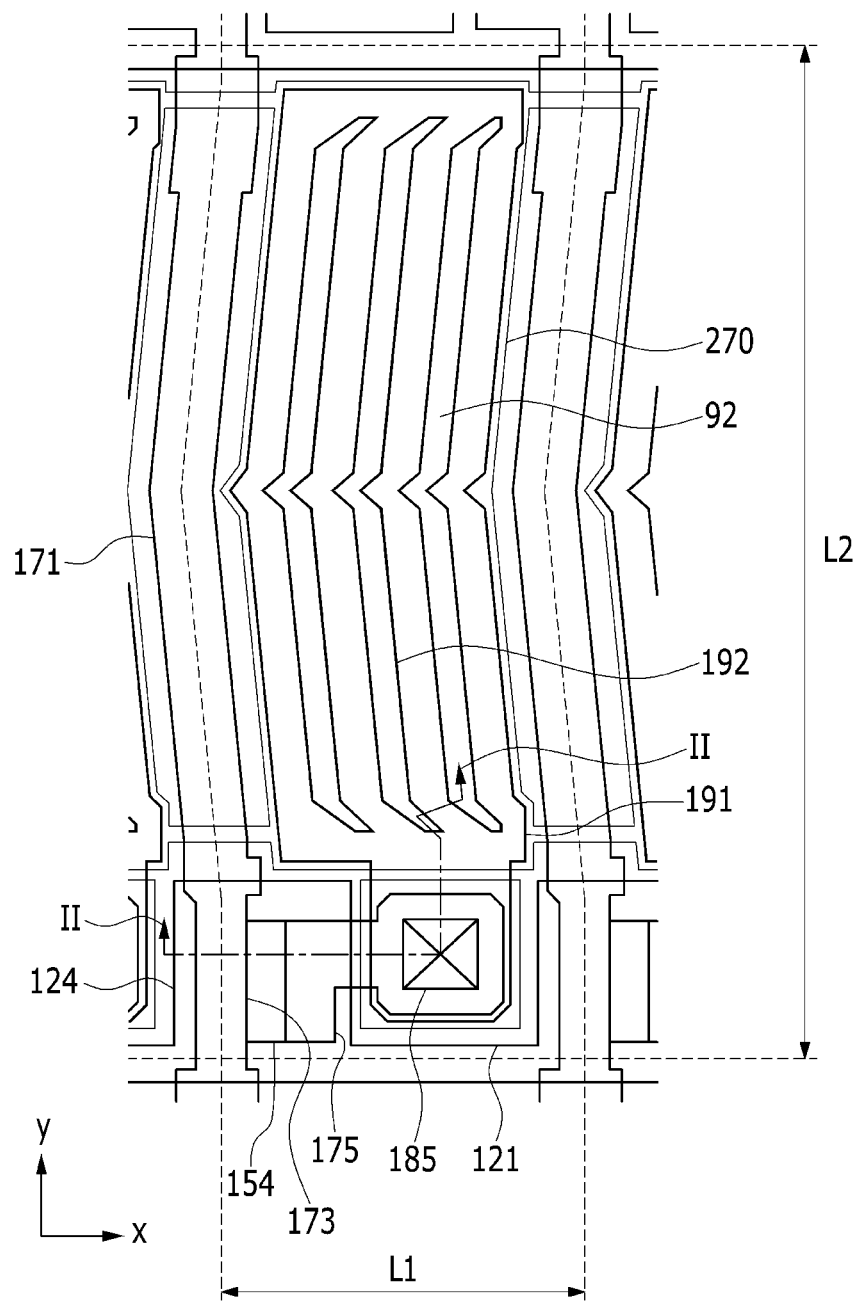
FIG. 1 is a plan view of an exemplary embodiment of a liquid crystal display ("LCD") according to the invention.

The invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the invention.

Further, in the exemplary embodiments, since like reference numerals designate like elements having the same configuration, a first exemplary embodiment is representatively described, and in other exemplary embodiments, only different configurations from those of the first exemplary embodiment will be described.

The drawings and description are to be regarded as illustrative in nature and not restrictive. Like reference numerals designate like elements throughout the specification.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Now, a liquid crystal display ("LCD") according to an exemplary embodiment of the invention will be described with reference to the accompanying drawings.

Figure 2:
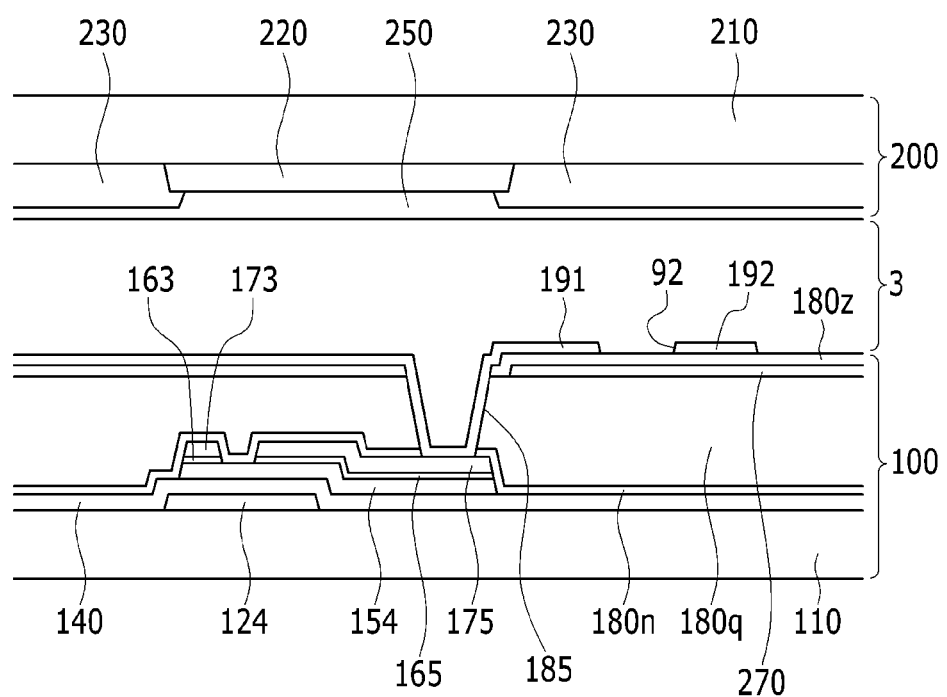
FIG. 2 is a cross-sectional view of the LCD of FIG. 1, taken along line II-II.

FIG. 1 is a plan view of an LCD according to an exemplary embodiment of the invention. FIG. 2 is a cross-sectional view of the LCD of FIG. 1, taken along line II-II.

Referring to FIGS. 1 and 2, an LCD includes a lower display panel 100 and an upper display panel 200 that face each other, and a liquid crystal layer 3 injected between the two display panels 100 and 200. In the exemplary embodiment, one pixel area will be exemplarily described. In an exemplary embodiment, the LCD may have resolution equal to or greater than 200 pixels per inch ("PPI"), for example. That is, the LCD may include about 200 or more pixels within an area of which the size is about 1×1 inches. In an exemplary embodiment, one horizontal length L1 of the pixel is about less than about 40 micrometers (μm) and a vertical length L2 may be less than about 120 μm, for example. Here, as shown in the drawing, the horizontal length L1 of the pixel is a gap between vertical center portions of two neighboring data lines 171, and the vertical length L2 of the pixel is a gap between horizontal center portions of two neighboring gate lines 121.

Now, the lower panel 100 will be described.

A gate conductor including the gate line 121 is disposed on a first substrate 110 including transparent glass or plastic. The first substrate 110 may be an insulating substrate, but is not limited thereto.

The gate line 121 includes a wide end portion (not illustrated) so as to be connected with a gate electrode 124 and other layers or an external driving circuit. In an exemplary embodiment, the gate line 121 may include aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), and titanium (Ti). In an alternative exemplary embodiment, the gate line 121 may have a multilayer structure which includes at least two conductive layers having different physical properties.

In an exemplary embodiment, a gate insulating layer 140 which includes a silicon nitride ($SiN_x$) or a silicon oxide ($SiO_x$) is disposed on the gate conductors 121 and 124. In an exemplary embodiment, the gate insulating layer 140 may have a multilayer structure which includes at least two insulating layers having different physical properties.

A semiconductor 154 which includes amorphous silicon or polysilicon is disposed on the gate insulating layer 140. In an exemplary embodiment, the semiconductor 154 may include an oxide semiconductor, for example.

Ohmic contacts 163 and 165 are disposed on the semiconductor 154. In an exemplary embodiment, the ohmic contacts 163 and 165 may include a material such as n+ hydrogenated amorphous silicon in which an n-type impurity such as phosphorus is doped at a high concentration, or of a silicide, for example. In an exemplary embodiment, the ohmic contacts 163 and 165 are provided as a pair to be disposed on the semiconductor 154. When the semiconductor 154 is an oxide semiconductor, the ohmic contacts 163 and 165 may be omitted.

The data line 171 including a source electrode 173 and a data conductor including a drain electrode 175 are disposed on the ohmic contacts 163 and 165 and the gate insulating layer 140.

The data line 171 includes a wide end portion (not illustrated) so as to be connected with another layer or an external driving circuit. The data line 171 transmits a data signal and extends in the substantially vertical direction to intersect the gate line 121.

The data line 171 may have a first curved portion which has a bent shape in order to obtain maximum transmittance of the LCD, and curved portions are provided at a center region of the pixel area and define a V shape. The pixel area includes a second curved portion which is bent to define a predetermined angle with the first curved portion in the center region of the pixel area.

In an exemplary embodiment, the first curved portion of the data line 171 may be bent at approximately about 7 degrees (°) with respect to a vertical reference line (y, a reference line extended in the y direction) which is perpendicular to a direction (x direction) in which the gate line 121 extends. In an exemplary embodiment, the second curved portion which is disposed at the center region of the pixel area is further bent to define an angle of approximately about 7° to about 15° with respect to the first curved portion.

The source electrode 173 is a part of the data line 171 and is disposed on the same line as the data line 171. The drain electrode 175 extends so as to be parallel to the source electrode 173. Therefore, the drain electrode 175 is parallel to the part of the data line 171.

The gate electrode 124, the source electrode 173, and the drain electrode 175 provide a thin film transistor ("TFT") together with the semiconductor 154, and a channel of the TFT is provided in the semiconductor 154 between the source electrode 173 and the drain electrode 175.

In an exemplary embodiment, the data line 171 and the drain electrode 175 may include a refractory metal such as molybdenum, chromium, tantalum, and titanium, or an alloy thereof. In an alternative exemplary embodiment, the data line 171 and the drain electrode 175 may have a multilayer structure which includes the refractory metal film (not illustrated) and a low resistance conductive layer (not illustrated). An exemplary embodiment of the multilayer structure includes a double layer of a chromium or molybdenum (alloy) lower layer and an aluminum (alloy) upper layer, or a triple layer of a molybdenum (alloy) lower layer, an aluminum (alloy) intermediate layer, and a molybdenum (alloy) upper layer. However, the invention is not limited thereto, and the data line 171 and the drain electrode 175 may include various other metals or conductors. In an exemplary embodiment, a width of the data line 171 measured in the x direction may be about 3.5 μm±0.75 μm.

A first passivation layer 180n is disposed on exposed portions of the data conductors 171, 173, and 175, the gate insulating layer 140, and the semiconductor 154. The first passivation layer 180n may include an organic insulating material or an inorganic insulating material.

A second passivation layer 180q is provided on the first passivation layer 180n. In another exemplary embodiment, the second passivation layer 180q can be omitted. In an exemplary embodiment, the second passivation layer 180q may be a color filter. When the second passivation layer 180q is a color filter, it can uniquely display one of primary colors. In an exemplary embodiment, the primary colors are three primary colors of red, green, and blue, or yellow, cyan, and magenta, for example. Although not illustrated, in an exemplary embodiment, the color filter may further include other color filters which display a mixed color of the primary colors or white in addition to the primary colors.

A common electrode 270 is provided on the second passivation layer 180q. The common electrode 270 has a planar shape so as to be disposed on the entire surface of the first substrate 110 as a whole plate, and an opening (not illustrated) is defined in the common electrode 270 in a region corresponding to the periphery of the drain electrode 175. That is, the common electrode 270 may have a planar shape in a plane view.

Common electrodes 270 which are disposed in adjacent pixels are connected to each other so that a common voltage having a predetermined magnitude supplied from outside of the display area is transmitted thereto.

A third passivation layer 180z is provided on the common electrode 270. The third passivation layer 180z may include an organic insulating material or an inorganic insulating material.

A pixel electrode 191 is provided on the third passivation layer 180z. The pixel electrode 191 includes a curved edge which is substantially parallel to the first curved portion of the data line 171. A plurality of cutouts 92 is defined in the pixel electrode 191 and a plurality of first branch electrodes 192 is defined by the plurality of cutouts 92.

A contact hole 185 is defined in the first passivation layer 180n, the second passivation layer 180q, and the third passivation layer 180z to expose the drain electrode 175. The pixel electrode 191 is physically and electrically connected to the drain electrode 175 through the contact hole 185 so as to be applied with the voltage from the drain electrode 175.

Although it is not illustrated, in an exemplary embodiment, an alignment layer is coated on the pixel electrode 191 and the third passivation layer 180z. In an exemplary embodiment, the alignment layer may be a horizontal alignment layer, and may include a photoreactive material to be optically aligned. In an exemplary embodiment, the optically aligned alignment layer may include a cyclobutane-based photodegradable material, an azobenzene-based photoisomerization material, and the like.

Now, the upper panel 200 will be described.

A light blocking member 220 is disposed on a second substrate 210 that includes transparent glass or plastic, for example. The second substrate 210 may be an insulating substrate, but is not limited thereto. The light blocking member 220 is also referred to as a black matrix, and prevents light leakage.

A plurality of color filters 230 is disposed on the second substrate 210. In an exemplary embodiment, when the second passivation layer 180q of the lower panel 100 is a color filter, the color filter 230 of the upper panel 200 may be omitted. In an exemplary embodiment, the light blocking member 220 of the upper panel 200 may also be provided in the lower panel 100.

An overcoat 250 is disposed on the color filters 230 and the light blocking member 220. The overcoat 250 may include an organic material or an inorganic material, and prevents exposure of the color filters 230 and provides a flat surface. In another exemplary embodiment, the overcoat 250 may be omitted.

An alignment layer is disposed on the overcoat 250. In an exemplary embodiment, the alignment layer may include a horizontal alignment layer, and may include a photoreactive material to be optically aligned.

In an exemplary embodiment, the liquid crystal layer 3 includes a nematic liquid crystal material having positive dielectric anisotropy, for example. Liquid crystal molecules of the liquid crystal layer 3 are arranged such that a major axis thereof is disposed parallel to the substrates 110 and 210, and has a structure in which the major axis is spirally twisted at about 90° from the alignment direction of the alignment layer of the lower panel 100 to the upper panel 200.

The pixel electrode 191 is applied with a data voltage from the drain electrode 175 and the common electrode 270 is applied with a common voltage with a predetermined magnitude from a common voltage applying unit which is disposed outside the display area.

The pixel electrode 191 and the common electrode 270 which are field generating electrodes generate an electric field so as to rotate the liquid crystal molecules of the liquid crystal layer 3 disposed on the two electrodes 191 and 270 in a direction parallel to a direction of the electric field. The polarization of the light which passes through the liquid crystal layer is varied depending on the rotational direction of the liquid crystal molecule determined as described above.

Hereinafter, an alignment of the pixel area and the light blocking member in the LCD according to the exemplary embodiment of the invention will be described with reference to FIGS. 3 to 5, and alignment of a pixel area and a light blocking member in an LCD according to another exemplary embodiment of the invention will be described with reference to FIGS. 6 to 8.

Figure 3:
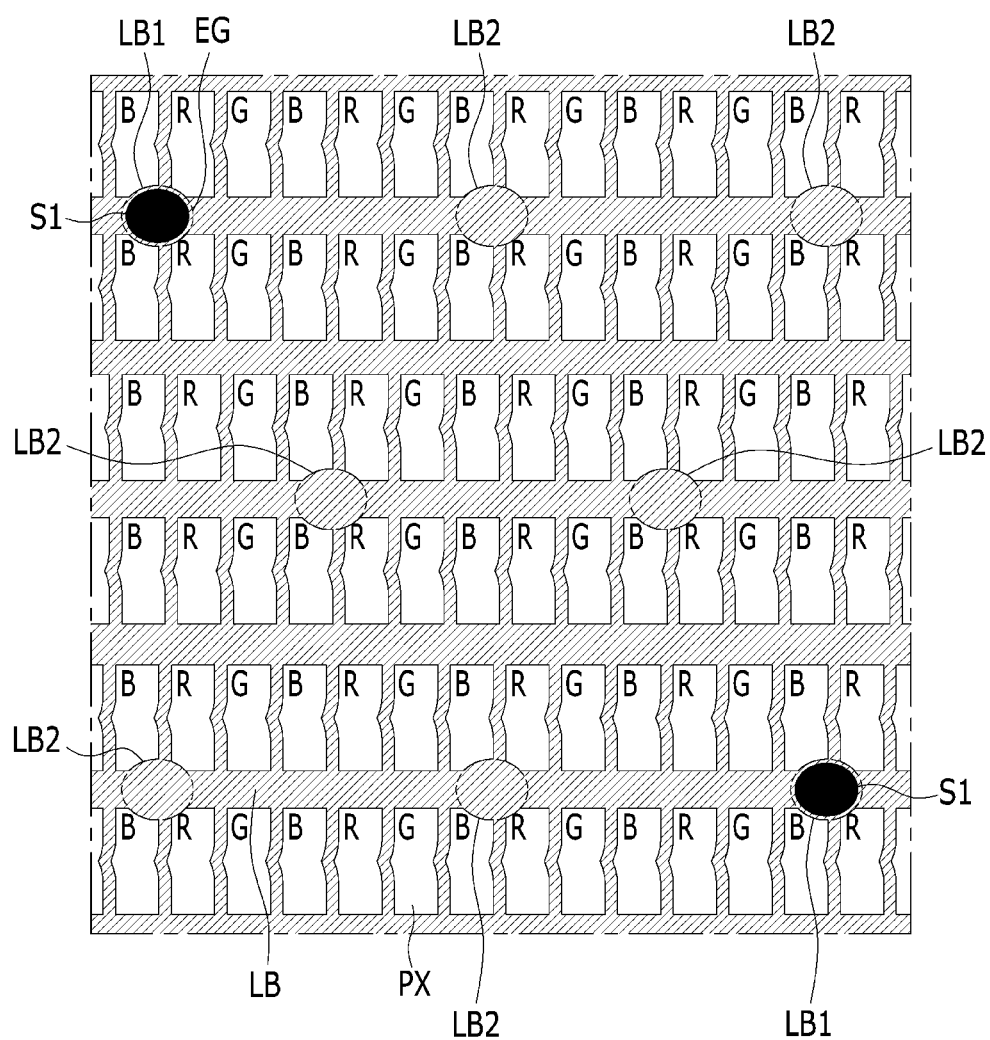
FIG. 3 is a plan view illustrating an exemplary embodiment of pixel area alignment in the LCD.

FIG. 3 is a plan view of an exemplary embodiment of alignment of the pixel area in the LCD. FIG. 4 is a cross-sectional view of a portion where the light blocking member is disposed in the LCD of FIG. 3. FIG. 5 is a top plan view of a portion where an expanded light blocking member is disposed in the LCD of FIG. 3.

Referring to FIG. 3, the LCD includes a plurality of pixel areas PX. Each pixel area PX indicates an opening area, and the plurality of pixel areas PX may be defined by opaque light blocking members LB. The light blocking member LB corresponds to the light blocking member 220 of FIG. 2. The plurality of pixel areas PX may be arranged in a matrix form.

The light blocking member LB includes expansion portions LB1 and LB2 provided at parts of the plurality of pixel areas PX. The expansion portions LB1 and LB2 of the light blocking member LB include first expansion portions LB1 overlapping spacers S1 and second expansion portions LB2 not overlapping the spacers S1. Each spacer S1 is provided between the lower panel 100 and the upper panel 200 to maintain a cell gap.

In an exemplary embodiment, the first expansion portion LB1 has a plane shape that is similar to the plane shape of the second expansion portion LB2 in a plan view.

In an exemplary embodiment, an edge of the first expansion portion LB1 and an edge of the second expansion portion LB2 may have plane shapes including at least one curved line. In an exemplary embodiment, referring to a dotted line portion in the drawing, a part of the light blocking member LB surrounded by an edge EG of the first and second expansion portions LB1 and LB2 may have a rounded plane shape. The plane shape provided by the edges EG of the first expansion portion LB1 and the second expansion portion LB2 of the light blocking member LB may be changed according to the plane shape of the spacer S1.

In an exemplary embodiment, the plurality of pixel areas PX includes a red pixel area R, a green pixel area G, and a blue pixel area B according to a color of the color filter. In the plurality of pixels PX arranged in the matrix form, a plurality of red pixel areas R arranged in a column along a vertical direction, a plurality of green pixel areas G arranged in a column along the vertical direction, and a plurality of blue pixel areas B arranged in a column along the vertical direction may be iteratively arranged along a horizontal direction.

In this case, the first expansion portion LB1 and the second expansion portion LB2 are provided between the blue pixel area B and the red pixel area R. The first expansion portion LB1 and the second expansion portion LB2 partially cover a neighboring pixel area PX because transmittance can be sufficiently assured by partially covering the blue pixel area B and the red pixel area R having relatively low contribution to transmittance rather than partially covering the green pixel area G having a relatively high contribution to transmittance. In addition, when the spacer S1 is provided adjacent to the green pixel region G, image quality may be more deteriorated due to light leakage by the spacer S1.

Figure 4:
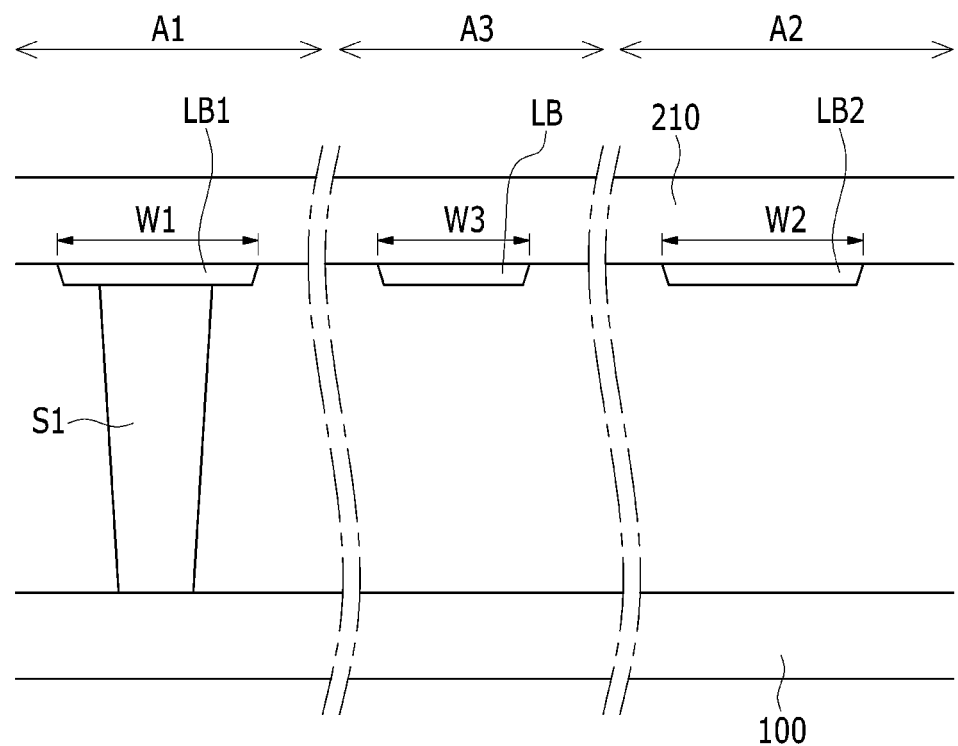
FIG. 4 is a cross-sectional view of a portion where a light blocking member is provided in the LCD of FIG. 3.

In FIG. 4, the spacers S1 and the light blocking members LB is mainly described, and descriptions regarding irrelevant portions will be omitted. The LCD includes a first expansion portion LB1 of the light blocking member LB provided in a first region A1, a second expansion portion LB2 of the light blocking member LB provided in a second area A2, and a light blocking member LB provided in a third area A3.

The light blocking member LB, the first expansion portion LB1, and the second expansion portion LB2 are provided on the second substrate 210. The first expansion portion LB1 and the second expansion portion LB2 of the light blocking members LB provided on the second substrate 210 may be expansion portions of the black matrix.

The first expansion portion LB1 of the light blocking member LB overlaps the spacer S1, and the second expansion portion LB2 of the light blocking member LB does not overlap the spacer S1.

As shown in the drawing, a width W1 of the first expansion portion LB1 and a width W2 of the second expansion portion LB2 of the light blocking member LB are greater than a width W3 of the light blocking member LB. Here, the width may be measured along a vertical direction in a plan view. In an exemplary embodiment, the width W1 of the first expansion portion LB1 and the width W2 of the second expansion portion LB2 may be substantially the same. In an exemplary embodiment, a diameter of the spacer S1 may be about 20 μm when the spacer S1 has a circular shape in a plan view, a distance from the edge of the spacer S1 to the edge EG of the first expansion portion LB1 may be about 13.5 μm, and the entire diameter of the first expansion portion LB1 may be about 47 μm, for example, when the first expansion portion LB1 has a circular shape in a plan view. In an exemplary embodiment, a diameter of the light blocking member LB provided in the third area A3 may be about 40 μm, for example. That is, the first expansion portion LB1 and the second expansion portion LB2 partially cover neighboring pixel areas PX.

Light leakage that may occur due to the spacer S1 can be prevented by disposing the first expansion portion LB1. In an exemplary embodiment, an aperture ratio difference between the first area A1 where the spacer S1 is disposed and the second area A2 where the spacer S1 is not disposed can be reduced by disposing the second expansion portion LB2. However, the green pixel region G is not covered by the first expansion portion LB1 or the second expansion portion LB2.

When the red pixel region R, the green pixel region G, and the blue pixel region B have the same width, portions covered by the first or second expansion portion LB1 or LB2 are provided in the red pixel region R and the blue pixel region B and thus an aperture ratio of the red and green pixel areas R and G becomes different from an aperture ratio of the green pixel area G. Accordingly, distortion of color coordinates may occur, thereby causing deterioration of display quality such as a spot.

Figure 5:
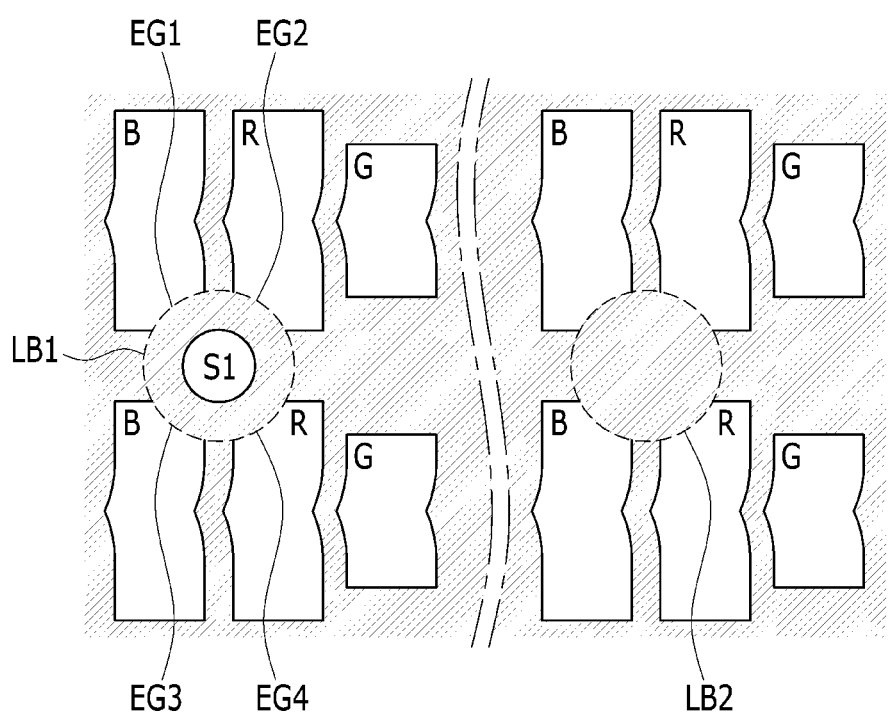
FIG. 5 is a top plan view of a portion where an expanded light blocking member is provide in the LCD of FIG. 3.

In order to solve such a problem, as shown in FIG. 5, an area of the green pixel area G may be set to be smaller than an area of the red pixel area R or an area of the blue pixel area B. In an exemplary embodiment, a width of the green pixel area G measured in a vertical direction in a plan view may be smaller than a width of the red pixel area R or a width of the blue pixel area B.

Referring to FIG. 5, the expansion portions LB1 and LB2 of the light blocking member LB are provided between a blue pixel area B and a red pixel area R that neighbor each other, and edges of the expansion portions LB1 and LB2 have a rounded plane shape.

In an exemplary embodiment, a first edge EG1 provided in a first blue pixel region B, a second edge EG2 provided in a first red pixel area R, a third edge EG3 provided in a second blue pixel area B, and a fourth edge EG4 provided in a second red pixel area R may have different shapes and lengths. That is, the area of the expansion portions LB1 and LB2 provided in the first blue pixel region B, the area of the expansion portions LB1 and LB2 provided in the first red pixel region R, the area of the expansion portions LB1 and LB2 provided in the second blue pixel region B, and the area of the expansion portions LB1 and LB2 provided in the second red pixel region R may be different from each other.

In an alternative exemplary embodiment, a first edge EG1 provided in the first blue pixel region B, a second edge EG2 provided in the first red pixel region R, a third edge EG3 provided in the second blue pixel region B, and a fourth edge EG4 provided in the second red pixel region R may be symmetrical to each other. That is, the area of the expansion portions LB1 and LB2 provided in the first blue pixel region B, the area of the expansion portions LB1 and LB2 provided in the first red pixel region R, the area of the expansion portions LB1 and LB2 provided in the second blue pixel region B, and the area of the expansion portions LB1 and LB2 provided in the second red pixel region R may be almost equal to each other.

Instead of having a portion covered by the first expansion portion LB1 or the second expansion portion LB2, an area of the green pixel region G may be smaller than the red pixel area R and the blue pixel area B. The area of the green pixel region G may be provided to be smaller by an area of a portion of the red pixel area R and the blue pixel area B covered by the first expansion portion LB1 or the second expansion portion LB2.

Thus, the blue pixel region B, the red pixel region R, and the green pixel region G may have the same aperture ratio, and deterioration of the display quality due to a difference of the aperture ratios can be prevented.

However, since the blue pixel region B and the red pixel region R have portions covered by the first expansion portion LB1 or the second expansion portion LB2 and the area of the green pixel region G is set to be small, the entire aperture ratio of the LCD is decreased and accordingly transmittance is decreased.

When the alignment layer of the LCD is rubbed through a rubbing process, light leakage occurs by the spacer, but as described with regard to FIG. 1, when the alignment layers included in the lower panel 100 and the upper panel 200 are photo-aligned, light leakage due to the spacer S1 hardly occurs. Since the light leakage by the spacer S1 hardly occurs, deterioration of the display quality due to the light leakage by the spacer S1 can be prevented even though the spacer S1 is provided adjacent to the green pixel area G.

Figure 6:
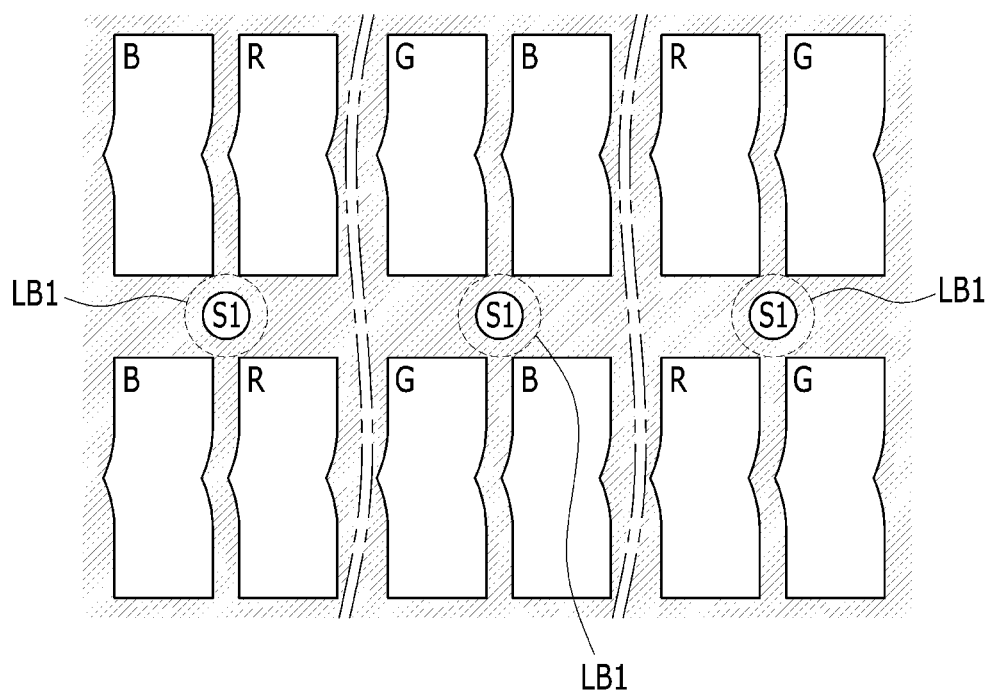
FIG. 6 is a cross-sectional view of another exemplary embodiment of a portion where a light blocking member is provided in an LCD according to the invention.

Therefore, as shown in FIG. 6, the spacer S1 may be provided not only between the blue pixel region B and the red pixel region R but also between the green pixel region G and the blue pixel region B and between the red pixel region R and the green pixel region G.

FIG. 6 is a top plan view of a portion where a light blocking member is provided in an LCD according to an exemplary embodiment of the invention. FIG. 7 is a plan view of a pixel area in the LCD according to the exemplary embodiment of the invention. FIG. 8 is a cross-sectional view of a portion where the light blocking member is provided in the LCD according to the exemplary embodiment of the invention.

Figure 7:
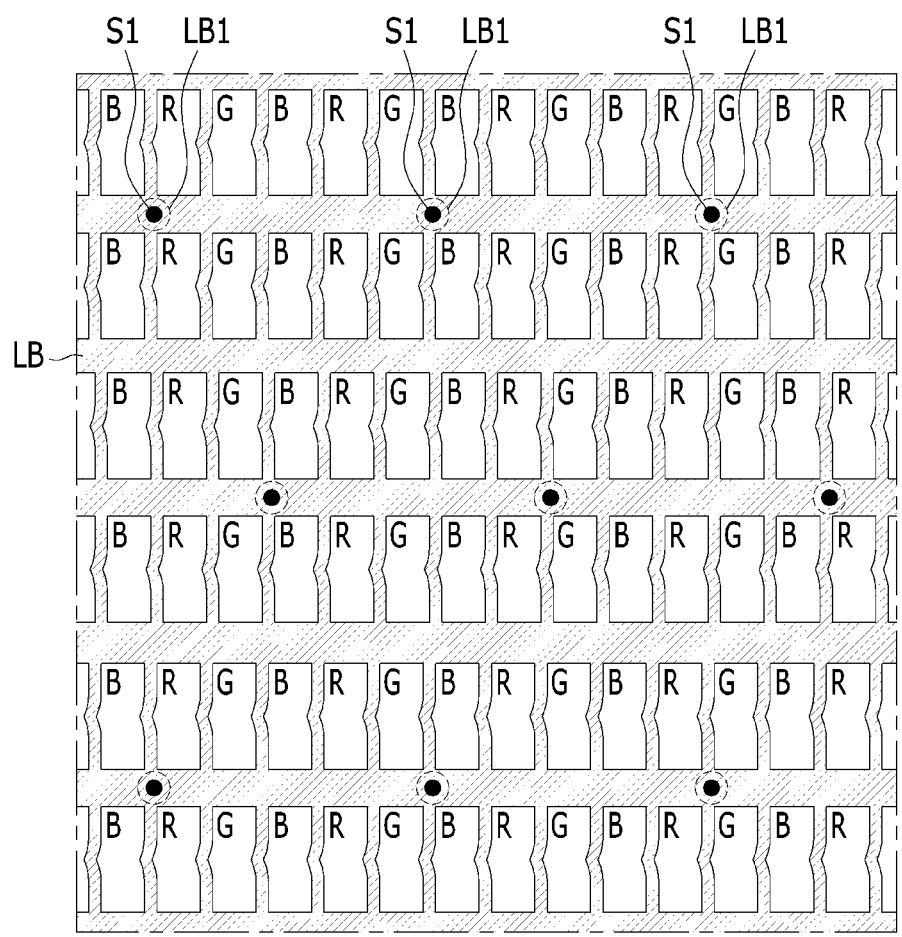
FIG. 7 is a plan view illustrating an exemplary embodiment of pixel area alignment in the LCD according to the invention.
Figure 8:
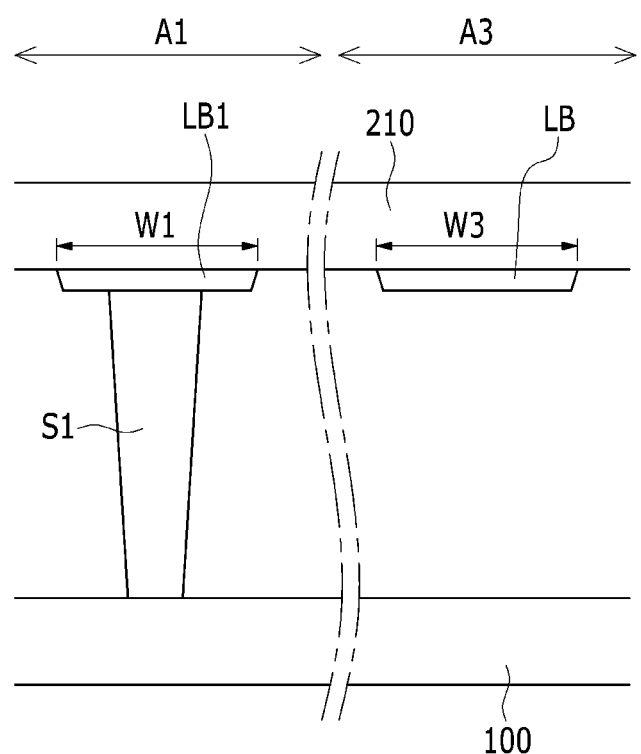
FIG. 8 is a cross-sectional view of another exemplary embodiment of a portion where a light blocking member is provided in the LCD according to the invention.

Referring to FIGS. 6 to 8, spacers S1 are respectively provided between a blue pixel region B and a red pixel region R, between a green pixel region G and a blue pixel region B, and between a red pixel region R and a green pixel region G.

Since the spacers S1 may be provided not only between the blue pixel region B and the red pixel region R but also between the green pixel region G and the blue pixel region B and between the red pixel region R and the green pixel region G, the number of spacers S1 provided in the LCD can be increased.

When the number of spacers S1 is increased, the lower panel 100 and the upper panel 200 can be supported by using a spacer S1 having a small diameter or a width. In an exemplary embodiment, in the LCD of FIG. 3, a diameter of the spacer S1 is about 20 μm but when the number of spacers S1 is increased, a spacer S1 having a diameter of about 12 μm can be used, for example. When the diameter of the spacer S1 is decreased, a diameter of the first expansion portion LB1 overlapping the spacer S1 can be decreased. In an exemplary embodiment, for the spacer S1 having a diameter of about 12 μm, the first expansion portion LB1 having a diameter of about 39 μm may be used, for example. In this case, a distance from an edge of the spacer S1 to an edge of the first expansion portion LB1 becomes about 13.5 μm.

As shown in FIG. 8, the LCD includes a first expansion portion LB1 of the light blocking member LB provided in a first area A1 and a light blocking member LB provided in a third area A3. Here, the first area A1 indicates a portion where the spacer S1 is provided, the third area A3 indicates an area where the light blocking member LB is provided between rows in a plurality of red pixel areas R, a plurality of green pixel areas G, and a plurality of blue pixel areas B.

The light blocking member LB and the first expansion portion LB1 are provided on a second substrate 210. The first expansion portion LB1 provided on the second substrate 210 may be an expansion portion of a black matrix. The first expansion portion LB1 overlaps the spacer S1, and a width W1 of the first expansion portion LB1 of the light blocking member LB may be equal to or smaller than a width W3 of the light blocking member LB. In an exemplary embodiment, a diameter of the spacer S1 is about 12 μm, a distance from an edge of the spacer S1 to an edge EG of the first expansion portion LB1 may be about 13.5 μm, and the entire diameter of the first expansion portion LB1 may be 39 μm. In an exemplary embodiment, the diameter of the light blocking member LB provided in the third area A3 may be about 40 μm.

Thus, the diameter of the first expansion portion LB1 becomes smaller than the light blocking member LB having a diameter of about 40 μm. Therefore, no portion is covered by the spacer S1 in the blue pixel area B, the red pixel area R, and the green pixel area G. Accordingly, the second expansion portion LB2 does not need to be provided as in FIG. 3. When no portion is covered by the spacer S1, the entire aperture ratio may become improved by about 24 percent (%).

In FIG. 7, the LCD includes the plurality of red pixel areas R, the plurality of green pixel areas G, and the plurality of blue pixel areas B. The plurality of red pixel areas R, the plurality of green pixel areas G, and the plurality of blue pixel areas B may be defined by the light blocking members LB. The light blocking member LB corresponds to the light blocking member 220 of FIG. 2. The plurality of red pixel areas R, the plurality of green pixel areas G, and the plurality of blue pixel areas B may be arranged in a matrix form. In the plurality of pixel areas PX arranged in the matrix form, a plurality of red pixel areas R arranged in a column along a vertical direction, a plurality of green pixel areas G arranged in a column along the vertical direction, and a plurality of blue pixel areas B arranged in a column along the vertical direction may be iteratively arranged along a horizontal direction.

The light blocking member LB includes the first expansion portion LB1 overlapping the spacer S1.

An edge of the first expansion portion LB1 may have a plane shape having at least one curved line. The plane shape provided by the edges of the first expansion portion LB1 of the light blocking member LB may be changed according to the plane shape of the spacer S1. Since the diameter of the first expansion portion LB1 is smaller than the width of the light blocking member LB, the first expansion portion LB1 may be substantially omitted.

The first expansion portion LB1 and the spacer S1 are provided between the blue pixel area B and the red pixel area R, between the green pixel area G and the blue pixel area B, and between the red pixel area R and the green pixel area G. As shown in the drawing, the first expansion portion LB1, that is, the spacer S1, may be provided at every five pixel areas along a horizontal direction for pixel areas of every two rows.

The alignment of the first expansion portions LB1 and the spacers S1 are exemplarily illustrated. Since the diameter of the first expansion portion LB1 is smaller than that of the light blocking member LB, the spacers S1 can be provided at any location in the light blocking member LB, and the alignment of the spacer S1 is not restrictive.

As described above, as an alignment failure that occurs due to a spacer S1 in photo-alignment is prevented, the spacer S1 can be provided adjacent to the green pixel area G, and accordingly the number of spacers S1 can be increased, and as the number of spacers S1 is increased, spacers S1 having a small width can be used. As the width of the spacers S1 is decreased, the width W1 of the first expansion portion LB1 can be reduced so as to prevent the first expansion portion LB1 from covering the pixel area PX. Accordingly, the entire aperture ratio of the LCD can be improved and distortion of color coordinates can be prevented, and accordingly deterioration of display quality can be prevented.

The accompanying drawings and the detailed description of the invention are only illustrative, and are used for the purpose of describing the invention but are not meant to limit the meanings or a scope of the invention described in claims. Therefore, it will be appreciated by those skilled in the art that various modifications and other equivalent exemplary embodiments can be made. Accordingly, the scope of the invention must be determined by the scope of the claims and equivalents, not by the described exemplary embodiments.

What is claimed is:

1. A liquid crystal display comprising:
   a plurality of red pixel areas;
   a plurality of green pixel areas;
   a plurality of blue pixel areas;
   a spacer configured to maintain a cell gap; and
   a light blocking member which defines the plurality of red pixel areas, the plurality of green pixel areas, and the plurality of blue pixel areas therein, wherein the plurality of red pixel areas, the plurality of green pixel areas, and the plurality of blue pixel areas are arranged in a matrix, wherein the light blocking member overlaps the spacer, wherein the spacer is provided between the plurality of green pixel areas and the plurality of blue pixel areas and between the plurality of red pixel areas and the plurality of green pixel areas and provided in plural with a ratio of one spacer per five pixel areas along a row direction of the matrix in two rows of the pixel areas, wherein a width of the spacer is equal to or smaller than 1/3 of a width of the light blocking member, and wherein the light blocking member extends more than 6 micrometers from a peripheral edge defining the spacer.

2. The liquid crystal display of claim 1, wherein the light blocking member comprises an expansion portion which overlaps the spacer, and a width of the expansion portion is smaller than or equal to a width of the light blocking member in a same direction.

3. The liquid crystal display of claim 2, wherein the expansion portion is provided between the plurality of blue pixel areas and the plurality of red pixel areas.

4. The liquid crystal display of claim 1, wherein the width of the light blocking member is a distance between adjacent rows in the matrix.

5. The liquid crystal display of claim 2, wherein the width of the spacer is smaller than the width of the expansion portion.

6. The liquid crystal display of claim 1, further comprising:
a lower panel including a first alignment layer; and
an upper panel facing the lower panel and including a second alignment layer,
wherein the first alignment layer and the second alignment layer are photo-aligned layers.

7. The liquid crystal display of claim 6, wherein the first alignment layer and the second alignment layer are horizontal alignment layers.

8. The liquid crystal display of claim 6, wherein the first alignment layer and the second alignment layer include at least one of a cyclobutane-based photodegradable material and an azobenzene-based photoisomerization material.

9. The liquid crystal display of claim 6, wherein the spacer maintains the cell gap by supporting the lower panel and the upper panel.

10. A liquid crystal display comprising:
a lower panel including a first substrate,
a thin film transistor provided on the first substrate,
a passivation layer provided on the thin film transistor,
a pixel electrode provided on the passivation layer, and
a first alignment layer on the pixel electrode;
an upper panel which includes a second substrate, a light blocking member and a color filter which are provided on the second substrate and faces the lower panel; and
a spacer configured to maintain a cell gap by supporting the lower panel and the upper panel,
wherein
the light blocking member defines a plurality of red pixel areas, a plurality of green pixel areas, and a plurality of blue pixel areas therein,
the plurality of red pixel areas, the plurality of green pixel areas, and the plurality of blue pixel areas are arranged in a matrix,
the spacer is provided in plural with a ratio of one spacer per five pixel areas along a row direction of the matrix in two rows of the pixel areas,
a width of the spacer is equal to or smaller than 1/3 of a width of the light blocking member, and
the light blocking member extends more than 6 micrometers from a peripheral edge defining the spacer.

11. The liquid crystal display of claim 10, wherein the light blocking member comprises an expansion portion overlapping the spacer, and the expansion portion is provided between the plurality of green pixel areas and the plurality of blue pixel areas and between the plurality of red pixel areas and the plurality of green pixel areas.

12. The liquid crystal display of claim 11, wherein the expansion portion is provided between the plurality of blue pixel areas and the plurality of red pixel areas.

13. The liquid crystal display of claim 10, wherein the width of the light blocking member is a distance between adjacent rows in the matrix.

14. The liquid crystal display of claim 11, wherein the width of the spacer is smaller than the width of the expansion portion.

15. The liquid crystal display of claim 10, further comprising a second alignment layer on the light blocking member and the color filter.

16. The liquid crystal display of claim 15, wherein the first alignment layer and the second alignment layer are photo-aligned layers.

17. The liquid crystal display of claim 16, wherein the first alignment layer and the second alignment layer are horizontal alignment layers.

18. The liquid crystal display of claim 16, wherein the first alignment layer and the second alignment layer include at least one of a cyclobutane-based photodegradable material and an azobenzene-based photoisomerization material.

* * * * *